(12) United States Patent
Oswald et al.

(10) Patent No.: US 7,132,157 B2
(45) Date of Patent: Nov. 7, 2006

(54) LAYER OBTAINED FROM AN AQUEOUS DISPERSION CONTAINING A SILICON/TITANIUM MIXED OXIDE POWDER PREPARED BY FLAME-HYDROLYSIS

(75) Inventors: Monika Oswald, Hanau (DE); Helmut Mangold, Rodenbach (DE); Klaus Deller, Hainburg (DE); Rolf Clasen, Saarbrücken (DE); Markus Hornfeck, Blieskastel (DE)

(73) Assignee: Degussa AG, Duesseldorf (DE)

( * ) Notice: Subject to any disclaimer, the term of this patent is extended or adjusted under 35 U.S.C. 154(b) by 0 days.

(21) Appl. No.: 10/045,049

(22) Filed: Jan. 15, 2002

(65) Prior Publication Data

US 2003/0134128 A1   Jul. 17, 2003

(30) Foreign Application Priority Data

Dec. 22, 2001   (DE) ................. 101 63 939

(51) Int. Cl.
- *B32B 18/00* (2006.01)
- *B32B 17/06* (2006.01)
- *B32B 19/00* (2006.01)
- *B05D 3/02* (2006.01)

(52) U.S. Cl. ............. 428/325; 428/331; 428/334; 428/335; 428/336; 428/432; 428/697; 428/702; 427/372.2; 427/376.1

(58) Field of Classification Search ............ 428/446, 428/697, 334, 335, 336, 325, 331; 423/610, 423/335, 336
See application file for complete search history.

(56) References Cited

U.S. PATENT DOCUMENTS

| | | | | |
|---|---|---|---|---|
| 3,629,666 A | * | 12/1971 | Yokozawa et al. .......... 257/635 |
| 3,967,296 A | * | 6/1976 | Intrator ....................... 257/778 |
| 4,297,143 A | * | 10/1981 | Kleinschmit et al. ....... 501/103 |
| 4,927,143 A | * | 5/1990 | Hillock ......................... 473/522 |
| 5,059,553 A | * | 10/1991 | Berndlmaier et al. ....... 438/614 |
| 5,451,390 A | | 9/1995 | Hartmann et al. |
| 5,672,330 A | * | 9/1997 | Hartmann et al. .......... 423/610 |
| 6,063,354 A | | 5/2000 | Mangold et al. ............. 423/336 |
| 6,309,753 B1 | * | 10/2001 | Grossman et al. .......... 428/428 |
| 6,328,944 B1 | | 12/2001 | Mangold et al. |
| 6,849,114 B1 | * | 2/2005 | Oswald et al. ........... 106/286.4 |

FOREIGN PATENT DOCUMENTS

| | | | |
|---|---|---|---|
| CA | 2227709 | | 7/1998 |
| DE | 2904199 A | * | 8/1980 |
| DE | 4 235 996 | | 4/1994 |
| DE | 4235996 A1 | * | 4/1994 |
| DE | 196 50 500 | | 6/1998 |
| DE | 199 36 478 | | 2/2001 |
| EP | 23587 A | * | 2/1981 |
| EP | 0 855 368 | | 7/1998 |
| JP | 58030710 | | 2/1983 |

* cited by examiner

*Primary Examiner*—Jennifer McNeil
*Assistant Examiner*—Timothy M. Speer
(74) *Attorney, Agent, or Firm*—Oblon, Spivak, McClelland, Maier & Neustadt, P.C.

(57) ABSTRACT

A layer which is obtained by thermal treatment from an aqueous dispersion applied to a substrate, the dispersion containing silicon/titanium mixed oxide powder prepared by flame hydrolysis. It is prepared by applying a dispersion which contains the silicon/titanium mixed oxide powder to a substrate and then sintering by using a thermal treatment. It can be used, for example, on materials with very low coefficients of expansion.

13 Claims, No Drawings

LAYER OBTAINED FROM AN AQUEOUS DISPERSION CONTAINING A SILICON/TITANIUM MIXED OXIDE POWDER PREPARED BY FLAME-HYDROLYSIS

The invention provides a layer which contains silicon/titanium mixed oxide powder prepared by flame-hydrolysis and the preparation and use thereof.

Layers which contain silicon dioxide and titanium dioxide are known. They are generally obtained by the so-called sol-gel process in which silicon and titanium alkoxides are deliberately hydrolyzed and polymerized in an organic solvent, usually an alcohol, and water. During polymerization a sol is initially produced and then, with increasing cross-linkage of the polymer units, a gel. This sol can be applied to a substrate, for example by dip-coating, and subsequently thermally treated and sintered.

It is also possible for the titanium component to be added in the form of titanium dioxide already and not as an alkoxide. Some of the silicon component may also be present as silicon dioxide.

Due to the high proportion of solvent in the gel, a high degree of shrinkage and the formation of cracks may also occur during extremely slow and careful drying. On the other hand it is difficult to form mechanically stable and thick layers with the low proportion of solids in the gel.

The object of the invention is to provide a layer on a substrate which has high mechanical stability and is free from cracks. The object of the invention is also a process for the preparation of this layer which leads to crack-free layers in a single coating step, wherein the thickness of the layer can be varied within wide limits.

The invention provides a layer, wherein the layer is obtained by thermal treatment from an aqueous dispersion applied to a substrate, the dispersion containing silicon/titanium mixed oxide powder prepared by flame hydrolysis. The layers may be transparent or opaque.

An aqueous dispersion is understood to be a dispersion with a proportion of powder of 0.1 to 60 wt. %, wherein the preferred range is between 2 and 40 wt. %. In addition, the dispersion may also contain inorganic or organic additives. Thus, for example, the pH of the dispersion may be adjusted with tetramethylammonium hydroxide or hydrochloric acid. The dispersion can be prepared by methods known to a person skilled in the art such as, for example, by using an agitator, a rotor/stator, attrition mills or high-pressure homogenisers in which a predispersed stream under high pressure has a self-milling effect.

Flame hydrolysis is understood to be the hydrolysis of silicon and titanium compounds in the gas phase in a flame, produced by the reaction of hydrogen and oxygen. Here, highly disperse, non-porous primary particles are initially formed which can grow during further reaction to form aggregates and these can grow further to form agglomerates. Substantially spherical particles can also be obtained during synthesis, depending on the choice of reaction conditions.

A mixed oxide is understood to be an intimate blend of titanium dioxide and silicon dioxide at the atomic level, with the formation of Si—O—Ti bonds. In addition, the primary particles may also contain regions of silicon dioxide alongside titanium dioxide. To be differentiated from the mixed oxide powders used according to the invention are physical mixtures of silicon dioxide and titanium dioxide powders, the use of which is not suitable for preparing layers according to the invention. Also to be differentiated are sols and gels which may also contain Si—O—Ti bonds, but which are not suitable for forming layers according to the invention due to their porous structure and the low bulk density resulting from the method of preparation.

Furthermore, the powder may contain traces of impurities from the starting materials such as also impurities arising from the process itself. These impurities may amount to up to 0.5 wt. %, but generally not more than 100 ppm.

Silicon/titanium mixed oxide powders may be prepared, for example, by the method described in DE-A-4235996 by mixing silicon tetrachloride and titanium tetrachloride and burning these together with a hydrogen/air mixture. Furthermore, a silicon/titanium mixed oxide powder can be prepared by the method described in DE-A-19650500 with the proviso that the proportion of the mixed oxide component with the smaller proportion by weight, either silicon dioxide or titanium dioxide, does not exceed 20 wt. %. In the event that titanium dioxide is the component with the smaller proportion by weight, an aerosol obtained by nebulization and containing the solution or suspension of a salt of a titanium compound is fed into a gas mixture containing a silicon tetrahalide, hydrogen and air and is mixed homogeneously with this and then the aerosol/gas mixture is reacted in a flame inside a combustion chamber. In the event that silicon dioxide is the component with the smaller proportion by weight, the aerosol contains the salt of a silicon compound and the gas mixture contains a titanium tetrahalide.

Suitable substrates to which the layer may be applied, are borosilicate glass, silica glass, glass ceramics, materials with very low coefficients of expansion (ultra-low expansion, ULE, materials), or other inorganic substrates.

Thermal treatment is understood to be annealing in kilns, flame sintering or laser sintering.

The layer may have a thickness between 100 nm and 1 mm, preferably between 1 μm and 50 μm and particularly preferably between 5 μm and 15 μm.

The BET surface area of the powder used for the layer may be between 5 and 500 m2/g and is controlled by adjusting the process parameters. Powders with BET surface areas between 20 and 50 m2/g are particularly advantageous.

The titanium dioxide content of the powder may be between 1 and 99 wt. %. A range between 2 and 12 wt. % is particularly preferred.

In accordance with a particular embodiment, the layer may contain a mixture of powders with high BET surface areas of at least 170 m2/g and those with low BET surface areas of at most 70 m2/g, preferably with high BET surface areas of at least 130 m2/g and those with low BET surface areas of at most 90 m2/g, wherein the ratio by weight of powders with lower to powders with higher BET surface areas is between 40:60 and 99.5:0.5.

The invention also provides a process for preparing the layer, wherein a dispersion which contains the silicon/titanium mixed oxide powder is applied to a substrate and this is then sintered by thermal treatment.

Borosilicate glass, silica glass, glass ceramics, materials with very low coefficients of expansion (ultra-low expansion, ULE, materials) or other inorganic substrates may be used as the substrate.

The dispersion may contain 0.1 to 60 wt. % of powder. A range between 2 and 40 wt. % is particularly preferred. A high density dispersion is preferred in particular for the application of thick layers. The dispersion may also contain inorganic or organic additives. Thus, for example, the pH of the dispersion can be adjusted with tetramethylammonium hydroxide or hydrochloric acid.

The dispersion can be prepared by methods known to a person skilled in the art such as, for example, by means of an agitator, a rotor/stator, attrition mills or high-pressure homogenisers in which a predispersed stream under high pressure has a self-milling effect.

Application of the dispersion can be achieved by dip-coating, painting, spraying or spreading. Dip-coating is particularly preferred.

Thermal treatment may be performed, for example, by annealing in kilns, flame sintering or laser sintering.

Layers according to the invention can be used in composite materials with materials with very low coefficients of expansion (ultra-low expansion, ULE, materials), for photocatalytic applications, as coatings for self-cleaning mirrors (superhydrophilic constituents), for optical items such as lenses, as seals for gases and liquids and as mechanical protective layers.

EXAMPLES

Example 1

Low Surface Area Silicon/Titanium Mixed Oxide Powder 5.8 kg/h $SiCl_4$ and 0.37 kg/h $TiCl_4$ are evaporated together at about 170° C. and fed into the central tube of a burner of known construction. 3.7 $Nm^3/h$ of hydrogen and 6 $Nm^3/h$ of air and 0.65 $Nm^3/h$ of oxygen are also fed into this mixture. This gas mixture flows out of the burner nozzle and is burnt in the combustion chamber of a water-cooled flame tube. 0.5 $Nm^3/h$ of (secondary) hydrogen and 0.3 $Nm^3/h$ of nitrogen are also fed to the jacket nozzle, which surrounds the central nozzle, in order to avoid caking. About 45 $Nm^3/h$ of air from the surroundings are also drawn into the flame tube which is under a pressure slightly lower than atmospheric. After flame hydrolysis, the reaction gases and the pyrogenic silicon/titanium mixed oxide powder are drawn under suction through a cooling system by applying a reduced pressure and the particle/gas stream is thus cooled to about 100 to 160° C. The solids are separated from the exit gas stream in a filter or a cyclone.

The pyrogenic silicon/titanium mixed oxide powder is produced as a white finely divided powder. Residues of hydrochloric acid which still adhere to the particles are removed from the mixed oxide powder at temperatures between 400 and 700° C., by treatment with steam-containing air, in a further step.

The BET surface area of the mixed oxide powder is 42 $m^2/g$. The analytical composition is 92.67 wt. % $SiO_2$ and 7.32 wt. % $TiO_2$.

The conditions of preparation are summarized in table 1 and further analytical data for the silicon/titanium mixed oxide powder obtained in this way are given in table 2.

Example 2

High Surface Area Silicon/Titanium Mixed Oxide Powder 5.8 kg/h $SiCl_4$ and 0.37 kg/h $TiCl_4$ are evaporated together at about 170° C. and fed into the central tube of a burner of known construction. 2.0 $Nm^3/h$ of hydrogen and 7.7 $Nm^3/h$ of air are also fed into this mixture. This gas mixture flows out of the burner nozzle and is burnt in the combustion chamber of a water-cooled flame tube. 0.5 $Nm^3/h$ of (secondary) hydrogen and 0.3 $Nm^3/h$ of nitrogen are also fed to the jacket nozzle, which surrounds the central nozzle, in order to avoid caking. About 12 $Nm^3/h$ of air from the surroundings are also drawn into the flame tube which is under a pressure slightly lower than atmospheric. After flame hydrolysis, the reaction gases and the pyrogenic silicon/titanium mixed oxide powder are drawn under suction through a cooling system by applying a reduced pressure and the particle/gas stream is thus cooled to about 100 to 160° C. The solids are separated from the exit gas stream in a filter or a cyclone.

The pyrogenic silicon/titanium mixed oxide powder is produced as a white finely divided powder. Residues of hydrochloric acid which still adhere to the particles are removed from the mixed oxide powder at temperatures between 400 and 700° C., by treatment with steam-containing air, in a further step.

The BET surface area of the mixed oxide powder of Example 2 is 269 $m^2/g$. The analytical composition is 92.68 wt. % $SiO_2$ and 7.32 wt. % $TiO_2$.

The conditions of preparation are summarized in table 1 and further analytical data for the silicon/titanium mixed oxide powder obtained in this way are given in table 2.

TABLE 1

Experimental conditions for the preparation of pyrogenic silicon/titanium mixed oxide powder

| Example | | 1 | 2 |
|---|---|---|---|
| $SiCl_4$ | kg/h | 5.8 | 5.8 |
| $TiCl_4$ | kg/h | 0.37 | 0.37 |
| Primary air | $Nm^3/h$ | 6 | 7.7 |
| $O_2$ added | $Nm^3/h$ | 0.65 | 0 |
| $H_2$ core | $Nm^3/h$ | 3.7 | 2.0 |
| $H_2$ jacket | $Nm^3/h$ | 0.5 | 0.5 |
| $v_k$ (std) | m/s | 23.9 | 22.6 |
| gamma core | — | 2.29 | 1.24 |
| lambda core | — | 1.03 | 1.61 |

Explanation: Primary air=amount of air in central tube (core); $O_2$ added=oxygen additionally fed into the core; $H_2$ core=hydrogen in the core nozzle; $V_k$ (std)=speed of flow of gas leaving the core nozzle, corrected to standard conditions (273.15 K, 1 atm); gamma core=proportion of hydrogen in the core nozzle; lambda core=proportion of oxygen in the core nozzle. A detailed explanation of the expressions gamma and lambda and the calculation thereof is given in EP-A-0855368.

TABLE 2

Analytical data for the samples obtained in example 1 and example 2

| Example | BET surface area $m^2/g$ | pH [1] | Bulk density g/l | Compacted bulk density g/l | $SiO_2$ content wt. % | $TiO_2$ content wt. % |
|---|---|---|---|---|---|---|
| 1 | 42 | 4.25 | 65 | 84 | 92.67 | 7.32 |
| 2 | 269 | 3.3 | 26 | 33 | 92.68 | 7.32 |

[1] 4% aqueous dispersion

Example 3

Preparation of an Aqueous Dispersion Containing the Mixed Oxide Powder from Example 1

90 g of water and 10.0 g of mixed oxide powder from example 1 are dispersed in an agitator and treated for about 1 hour in an ultrasonic bath. Then the dispersion is filtered through a 60 μm sieve.

Example 4

Preparation of an Aqueous Dispersion Containing the Mixed Oxide Powders from Examples 1 and 2

315 g of water and 10.5 g of mixed oxide powder from example 2 and 24.5 g of mixed oxide powder from example 1 are dispersed using an agitator and treated in an ultrasonic bath for about 1 hour. Then the dispersion was filtered through a 60 μm sieve.

Example 5

Dip-coating of Borosilicate Glass Using the Dispersion from Example 4

The dispersion from example 4 is applied to a borosilicate glass using dip-coating. The speed of immersion in the dispersion is 3 mm/s, the stationary time in the dispersion is 5 s, the speed of withdrawal is also 3 mm/s. Drying is performed in air at room temperature.

Sintering of samples preheated to about 300° C. is performed using a laser ($CO_2$ laser Rofin Sinar RS700 SM).

The laser power is 590 W at a mirror frequency of 540 rpm. The sample is moved along under the laser beam with a calculated speed of about 2.32 mm/s and cooled slowly after sintering (circulating air oven, kept at 500° C. for 1 hour and then cooled to room temperature over the course of 10 hours).

The thickness of the transparent layer was about 2.4 μm, as determined by measuring the profile. The layer exhibited no cracks under an optical microscope.

The invention claimed is:

1. An article comprising a layer and a substrate, wherein the layer is obtained by thermal treatment of an aqueous dispersion that has been applied to a substrate, the dispersion containing a silicon/titanium mixed oxide powder prepared by flame hydrolysis and wherein said silicon/titanium mixed oxide powder is a mixture of powders comprising at least one powder having a BET surface area of at least 130 $m^2/g$ and at least one powder having a BET surface area of at most 90 $m^2/g$, wherein the ratio by weight of the powders with a lower BET to the powders with a higher BET surface area ranges from 40:60 to 99.5:0.5.

2. The article as claimed in claim 1, wherein the thickness of the layer ranges from 100 nm to 1 mm.

3. The article as claimed in claim 1, wherein the thickness of the layer ranges from 1 μm to 50 μm.

4. The article as claimed in claim 1, wherein the thickness of the layer ranges from 5 μm to 15 μm.

5. The article as claimed in claim 1, wherein said silicon/titanium mixed oxide powder is a mixture of powders comprising at least one powder having a BET surface area of at least 170 $m^2/g$ and at least one powder having a BET surface area of at most 70 $m^2/g$, wherein the ratio by weight of the powders with a lower BET to the powders with a higher BET surface area ranges from 40:60 to 99.5:0.5.

6. The article as claimed in claim 1, wherein the titanium dioxide content of the powder ranges from 0.1 to 99.9 wt. %.

7. The article as claimed in claim 1, wherein the titanium dioxide content of the powder ranges from 2 to 20 wt. %.

8. The article as claimed in claim 1, wherein the substrate is selected from the group consisting of borosilicate glass, silica glass, glass ceramic, and a material with a very low coefficient of expansion.

9. The article as claimed in claim 1, further comprising less than 0.5 wt. % of impurities.

10. A process for preparing an article as claimed in claim 1, comprising applying a dispersion containing a silicon/titanium mixed oxide powder to a substrate, and thermal treatment sintering the dispersion applied to the substrate to form a layer.

11. The process as claimed in claim 10, further comprising preparing the dispersion by flame hydrolyzing a silicon/titanium mixed oxide powder, wherein the proportion of powder ranges from 0.1 to 60 wt. % in the dispersion.

12. A method comprising coating a material comprising forming a layer by thermal treating an aqueous dispersion that has been applied to said material, the dispersion containing a silicon/titanium mixed oxide powder prepared by flame hydrolysis and wherein said silicon/titanium mixed oxide powder is a mixture of powders comprising at least one powder having a BET surface area of at least 130 $m^2/g$ and at least one powder having a BET surface area of at most 90 $m^2/g$, wherein the ratio by weight of the powders with a lower BET to the powders with a higher BET surface area ranges from 40:60 to 99.5:0.5 and wherein said material is selected from the group consisting of an ultra-low expansion material a photocatalytic material, a self-cleaning mirror, a superhydrophilic constituent, a lens, a container for a gas and a container for a liquid.

13. The article as claimed in claim 5, wherein the titanium dioxide content of the powder ranges from 2 to 20 wt. %.

* * * * *